United States Patent Office 2,748,087
Patented May 29, 1956

2,748,087

PROCESS FOR INHIBITING FOAM

Louis T. Monson, Puente, Calif., assignor to Petrolite Corporation, a corporation of Delaware No Drawing. Application December 18, 1951,
Serial No. 262,322

14 Claims. (Cl. 252—321)

In my co-pending application, Serial No. 180,691, filed August 21, 1950, now Patent No. 2,622,069, issued December 16, 1952, I have disclosed and claimed a process for inhibiting foam in which hydrophile oxyalkylated synthetic resins are employed.

I have now made what amounts to an invention within the broadest aspects of that invention, in that I have discovered that a particular sub-genus of the genus of hydrophile oxyalkylated synthetic resins is especially effective in reducing or destroying foam or preventing its formation, in compositions of either aqueous or non-aqueous character.

Foams occur as undesirable, incidental features in many industrial processes. The theory of their formation is not highly developed; so that hypotheses on which foam reduction or destruction processes might be based are difficult to formulate. As a consequence, foam-destroying agents are usually devised for use in the case of particular foams.

I have discovered a novel process of reducing or destroying foams and of preventing their formation, which appears to be relatively general in applicability, in that it may be used on compositions comprising aqueous materials or solutions; on compositions comprising non-aqueous materials, such as hydrocarbon liquids; and on compositions comprising mixtures of aqueous and non-aqueous media. My process consists in subjecting a foaming or potentially-foaming composition to the action of a small proportion of a reagent or anti-foamer of the kind subsequently described, thereby causing the foaming properties of the liquid to be diminished, suppressed or destroyed. In applying my process to the reduction or destruction of a foam, the reagent may be poured or sprayed or dripped into the body of foam on top the liquid, as desired; and the foam breaks and is destroyed or reduced, substantially at once, as a consequence of such addition of said reagent. Adding the reagent to the liquid underlying such already-formed foam is also practicable. In applying my process to the prevention of foaming, the reagent is admixed, in some small proportion, with a potentially-foaming liquid, by any desired or suitable procedure. The ability of the system to foam is destroyed or at least materially reduced by such addition of said reagent.

Reference is made to United States Patent No. 2,499,370, to De Groote and Keiser, dated March 7, 1950, wherein, for use as demulsifiers for petroleum emulsions, certain hydrophile oxyalkylated synthetic resins are claimed. The reagents of the present invention lie within the class of reagents described in said patent. They are characterized by the fact that at least one-half by weight of the oxyalkylated synthetic resin consists of the element $(C_3H_6O)_n$, wherein $C_3H_6$ is the propylene radical. Stated another way, at least one-half by weight of my oxyalkylated synthetic resin is derived from propylene oxide. My present reagents are therefore essentially those of said De Groote and Keiser patent which meet the limitation just expressed.

One or more of the other alkylene oxides, ethylene oxide, butylene oxide, hydroxypropylene oxide (glycid) or hydroxybutylene oxide (methylglycide), may be present in my reagent. In some instances, incorporation of the optimum proportion of such other alkylene oxide acts to raise the effectiveness of my already highly effective reagent to an even higher level of performance.

My process is therefore a process for inhibiting foam, characterized by subjecting a foaming composition to the action of a reagent including a hydrophile oxyalkylated 2,4,6 $C_4$- to $C_{14}$-hydrocarbon-substituted monocyclic phenol-$C_1$- to $C_3$-aldehyde resin; the alkylene radicals of the oxyalkylene groups being selected from the class consisting of ethylene, propylene, butylene, hydroxypropylene, and hydroxybutylene radicals; with the proviso that at least one-half by weight of said oxyalkylated resin consist of a multiple of the divalent oxypropylene group, $C_3H_6O$.

More precisely expressed, mine is a process for inhibiting foam, characterized by subjecting a foaming composition to the action of a reagent including hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic-solvent-soluble, water-insoluble phenol-aldehyde resin; said resin being derived by reaction between a difunctional monohydric phenol and an aldehyde having not over 8 carbon atoms and reactive toward said phenol, said resin being formed in the substantial absence of phenols of functionality greater than two; said phenol being of the formula

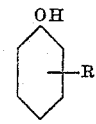

in which R is a hydrocarbon radical having at least 4 and not more than 14 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals; $n$ being a numeral of such size that at least one-half by weight of said oxyalkylated resin consists of a multiple of the divalent oxypropylene group, $C_3H_6O$.

Stated in still greater detail, the hydrophile properties of said oxyalkylated resin are sufficient to produce an emulsion when said oxyalkylated resin is dissolved in an equal weight of xylene and said xylene solution is shaken vigorously with from one to three volumes of water. The resin is preferably a low-stage resin having an average molecular weight corresponding to from 3 to 7 phenolic nuclei per resin molecule; the aldehyde is preferably an aliphatic aldehyde, and most preferably formaldehyde; and the resinification reaction is preferably acid-catalyzed.

I incorporate into this present application by reference the 103 "a" examples of alkylphenol-aldehyde resins set out in Patent No. 2,499,370. These may be employed as starting materials to produce the oxyalkylated derivatives employed in my process. Most of the "b" examples of said patent relate to oxyethylated derivatives of such resins; but Examples 2b and 11b relate to oxypropylated derivatives of the present class; and I incorporate them into this application by reference.

Example 2b of the above-mentioned U. S. Patent No. 2,499,370 calls for the oxypropylation of 170 grams of butylphenol-formaldehyde resin with 400 grams of propylene oxide, following the procedure outlined in Example 1b of said patent. The product of Example 2b of said patent is therefore an example of the present class of materials.

Likewise, Example 11b of said patent calls for the oxypropylation of the paradodecylphenol-formaldehyde resin of Example 74a of that patent, using 600 grams of propylene oxide and 170 grams of resin, and the oxyalkylation procedure of Example 1b of the patent. The product of Example 11b of said patent is therefore an example of the present class of materials.

Additional examples of the preparation of materials suitable for use in my present process are given below.

*Example 1*

Use the para-tertiary amylphenol-formaldehyde resin of Example 3a of U. S. Patent No. 2,499,370, to De Groote and Keiser. To 350 grams of said resin, mixed with 350 grams of commercial aromatic petroleum solvent, add 20 grams of sodium hydroxide in the form of a 50% aqueous solution, in a conventional stirring autoclave. Heat the mixture to evaporate the water of solution. Then seal the autoclave, raise the temperature to about 125° C., and pass in propylene oxide until a total of 500 grams has been introduced.

*Example 2*

To the finished product of Example 1 above, still in the autoclave, add 75 grams of ethylene oxide in a slow, continuous stream, at a temperature about 165° C., avoiding development of any pressure above about 50 p. s. i. g.

*Example 3*

Repeat Example 1 above using the amylphenol-glyoxal resin of Example 13a of above-mentioned U. S. Patent No. 2,499,370 instead of the amylphenol-formaldehyde resin, employing the same weights of resin and propylene oxide as in Example 1 above.

*Example 4*

To the finished product of Example 3 above, still in the autoclave, introduce 100 grams of ethylene oxide in a slow, continuous stream, at a temperature of about 165° C., avoiding development of any pressure above about 50 p. s. i. g.

*Example 5*

Repeat Examples 1 and 2 above, using the paratertiary butylphenol-acetaldehyde resin of Example 14a of above-mentioned U. S. Patent No. 2,499,370, and the weights and conditions of Examples 1 and 2 above.

*Example 6*

Use 350 grams of the nonylphenol-formaldehyde resin of Example 70a of above-mentioned U. S. Patent No. 2,499,370 instead of the amylphenol-formaldehyde resin of Examples 1 and 2 above. Use the weights and conditions of Examples 1 and 2 above.

*Example 7*

Use an octylphenol-formaldehyde resin prepared by reacting molal proportions of commercial octylphenol and commercial 37% formaldehyde in conventional manner. To 400 grams of this resin, and 400 grams xylene, and in the presence of 25 grams of sodium hydroxide, add 600 grams of propylene oxide, in a stirring autoclave. A temperature of about 160° C. is acceptable for this reaction, although lower temperatures, of the order of 110–120° C., may be employed if the reaction time is increased.

*Example 8*

Into the xylene solution of oxypropylated product of Example 7 above, introduce 125 grams of ethylene oxide at a temperature of about 165° C. and a pressure not exceeding 50 p. s. i. g.

*Example 9*

Prepare a tetradecylphenol-formaldehyde resin from commercial grade C14 alkylphenol and formaldehyde, in conventional manner. To 500 grams of this resin and 500 grams xylene, add 30 grams of sodium hydroxide, in aqueous solution. Distill off the water of solution, in a conventional stirring autoclave. Seal the autoclave and pass in 800 grams of propylene oxide at a temperature of 150° C., regulating the flow of alkylene oxide to maintain a pressure of not more than 50 p. s. i. g.

*Example 10*

Into the xylene solution of oxypropylated product of Example 9 above, introduce 200 grams of ethylene oxide at a temperature of about 165° C. and a pressure not exceeding 50 p. s. i. g.

*Example 11*

To 350 grams of the resin of Example 1 above add 150 grams of glycid, at about 90° C., in the presence of 25 grams of sodium hydroxide, introducing the glycid in small portions and permitting dissipation of any temperature increase before adding the next portion of the oxyalkylating agent. Then proceed with the oxypropylation as in said Example 1 above, but using a total of 650 grams of propylene oxide.

*Example 12*

Use 500 grams of the resin of Example 9 above. Before proceeding with the oxypropylation as in said example, introduce 145 grams of butylene oxide at a temperature of about 170° C. Then proceed with the addition of propylene oxide as in said Example 8 above, using a total of 800 grams of propylene oxide.

*Example 13*

Substitute methylglycid for glycid in Example 11 above, gram for gram, using the other reactants, and the conditions of said Example 11.

*Example 14*

Add 75 grams of ethylene oxide to the oxypropylated product of Example 13 above, using a temperature of about 165° C. and a pressure not exceeding 50 p. s. i. g.

In the foregoing examples, where no addition of ethylene oxide was specified, it is of course possible to introduce such alkylene oxide, just as was illustrated by Examples 2 and 4 above.

In oxypropylating the various resinous starting materials, it will usually be found that reaction is not as readily achieved as would be oxyethylation. The directions given in the aforementioned De Groote and Keiser patent relate mostly to oxyethylation. Those directions may be translated to oxypropylation if the lesser reactivity of propylene oxide is recognized. In other words, oxypropylation usually requires a higher temperature than oxyethylation if it is to be accomplished in the same time; or, conversely, at a given temperature, oxypropylation requires a longer time than oxyethylation. Oxyalkylation procedures are so well-known that it is unnecessary to do more than state that oxyalkylation is conducted by conventional procedures, to produce the reagents of the present process.

As a preferred example of my present class of foam inhibitors, the following may be recited:

Charge into a stirring autoclave 50 grams of an amylphenol-formaldehyde resin, of conventional character, e. g., that of Example 3a of U. S. Patent No. 2,499,370, and 50 grams of commercial aromatic petroleum solvent. Introduce 6 grams of sodium hydroxide in the form of a 50% aqueous solution. Heat until the water of solution is substantially completely removed, with stirring. Seal the autoclave, purge with nitrogen, and introduce 850 grams of propylene oxide at a temperature of about 120° C., maintaining a pressure of less than about 20 p. s. i. g. Thereafter, introduce 100 grams of ethylene oxide at about 165° C. Dilute the product with 1450 grams more of aromatic petroleum solvent. The resulting product is suitable for use as a foam inhibitor.

This preferred example illustrates the fact that my reagents may include oxyalkylene groups derived or derivable from alkylene oxides other than propylene oxide. Such other oxyalkylene groups may be introduced into the molecule either before or after the introduction of the oxypropylene group; and in most instances it is possible to introduce them simultaneously. For example, one may oxyalkylate with a mixture of ethylene oxide and propylene oxide, both oxides being absorbed by the oxyalkylation-susceptible synthetic resin.

My present class of oxyalkylated resinous derivatives may be used alone in foam inhibition, or they may be used in admixture with any other effective and compatible anti-foamer, e. g., with the reagents described and claimed in my U. S. Patent No. 2,408,527, dated October 1, 1946, those described and claimed in my co-pending application, Serial No. 775,145, filed September 19, 1947, now Patent 2,622,070, granted December 16, 1952, or those described and claimed in my co-pending application, Serial No. 180,691, filed August 21, 1950, now Patent 2,622,069, granted December 16, 1952.

It is usually convenient to dilute my reagents during manufacture or before use with some suitable solvent. Solvents generally suitable for incorporation into my reagent include: water; petroleum hydrocarbons, like gasoline, kerosene, stove oil, aromatic solvent; coal tar products, such as benzene, toluene, xylene, tar acid oil, cresol, anthracene oil; alcohols, particularly aliphatic alcohols like methyl, ethyl, isopropyl, butyl, hexyl, octyl, etc. Miscellaneous solvents, such as pine oil, carbon tetrachloride, etc., may be employed. Sometimes other factors such as whether it imparts an objectionable odor to the defoamed composition or to the products into which it finds its way will determine the choice of solvent. In general, the amounts of finished anti-foamer reagent employed are so small that considerable tolerance of undesirable properties in a solvent exists.

The mixture of active ingredients and solvents is stirred until homogeneous. I prefer to employ a petroleum distillate in the proportion of 25 to 50% of the finished product, by volume, although water is an excellent solvent in some instances.

I desire to point out that the superiority of the reagent contemplated in my process is based upon its ability to reduce or destroy foam, or to prevent foam formation, in certain foaming or potentially foaming compositions more advantageously and at lower cost than is possible with other reagents or processes. In certain instances, it has been found to destroy or reduce foams or prevent their formation, which foams were not economically or effectively reducible or preventable by any other known means.

My reagents are useful in controlling foams in many different types of system, aqueous and non-aqueous. They will control foams encountered in the manufacture of alkaline hypochlorite bleaches. They are effective in controlling foam in petroleum refining operations. They are effective in inhibiting foam in a gas-treating system, in which a mixture of glycols and alkanolamines is used to dehydrate and purify natural gas.

I have applied my reagents to the control of foam in protein adhesives solutions, such as casein and soybean adhesives, as used in the plywood industry. Latex adhesives, printing inks, aqueous emulsion paints, all produce foams which are amenable to my reagents.

In the foregoing description, I have made it clear that my reagents may be used to reduce, destroy, or prevent foam. In the appended claims I have used the word "inhibit" to include all these corrective and preventive aspects of my process and reagents.

The procedures employed in practising my process are numerous. The following description will illustrate several techniques commonly employed. It should be understood that the claims are not limited to the procedures described; and that my process consists broadly in bringing into contact by any suitable means my reagent and the foam or the potentially foaming composition.

In controlling foam in a glycol-amine gas treating plant handling natural gas, the glycol-amine mixture had a volume of about 2,000 gallons and make-up was about 2,000 gallons a month. My preferred reagent was injected into the liquid mixture in the return line from the stripping operation, by means of an electrically-powered proportioning pump of conventional design. The feed rate was less than 1 quart daily. Foam difficulties in the system were satisfactorily controlled by this procedure.

In sewage plants, for example, in activated-sludge-process plants, foam is frequently a serious problem in aeration basins and elsewhere. In one such plant, I have demonstrated that my reagent will control foam when sprayed into the head of foam, or when sprayed into or simply poured into the liquid in such basin. The foam-inhibiting effect appears to persist quite satisfactorily.

Determination of the optimum or minimum amount of my foam-inhibiting reagent to be used in any application may be accomplished in different ways. Small portions of the potentially foaming liquid may be filled into test bottles, different small proportions of my reagent added, and the chemicalized samples shaken for a short time. Simple observation of the relative speed and completeness of foam destruction should permit selection of the best reagent proportion to be applied on the large scale. The easiest way to determine the amount of my reagent required is to introduce it into the foaming or potentially foaming liquid in a fairly large proportion, e. g., 1%, and then to reduce the reagent feed rate until foam destruction is just being accomplished satisfactorily. Usually foam destruction is directly proportional to the amount of reagent used, at least up to about 1% of reagent. In a few instances, it may be found that using more or less reagent than an optimum proportion will give inferior results.

If the proportions of reagent to be employed in the above test are very small, it may be desirable to determine the optimum proportions of foaming composition and anti-foamer by introducing the latter into the sample of foaming liquid in the form of a solution in a suitable solvent.

Throughout this specification, I have shown that my process is equally applicable to systems in which a foam is already in existence and to systems which are potentially foaming compositions, in that they have the property of producing foams when agitated or mixed with air or some other suitable gas. Destruction, reduction and prevention are substantially equivalent actions. It is impossible to determine whether the reagent does in fact prevent the formation of the initial laminae of foam or whether such initial laminae are destroyed by the reagent before subsequent laminae of sufficient stability to produce a foam can be superimposed thereon. By "foaming composition" in the appended claims, I mean a composition which is either actually foaming or which is capable of producing a foam under suitable conditions, e. g., by simply passing air through it.

In most instances, my reagent is effective to the extent that it destroys an existing foam substantially completely. In some instances, as when too little reagent is used, foam reduction may be slow or even incomplete. I intend that this description and my invention relate both to complete destruction and to partial destruction of foams.

The proportions of my reagent required to be employed appear to vary widely. However, I wish to limit my invention to the use of my reagent in amounts 1% or less of the foaming composition. Usually, the amounts required will be between 0.1% and 0.0001%.

I have stated above that my present reagents may be used in conjunction with any other effective and compatible anti-foamer. It should also be stated that they are useful in conjunction with foam-inhibiting processes which are mechanical or electrical in character, rather than chemical. For example, some foams may be effectively destroyed by water sprays or jets. Incorporation of a small proportion of my reagents into such water sprays increases their effectiveness. U. S. Patent No. 2,240,495, to Dillon et al., dated May 6, 1941, relates to a process for resolving foam by means of a high electrical potential. Incorporation of a small proportion of my present reagents into the foaming liquid increases the effectiveness of such electrical processes.

Having thus described my invention, what I claim as novel and desire to secure by Letters Patent is:

1. A process for inhibiting foam, characterized by subjecting a non-detersive foaming composition to the action of not more than 1% of a hydrophile oxyalkylated 2,4,6 $C_4$- to $C_{14}$-hydrocarbon-substituted monocyclic phenol— $C_1$- to $C_8$-aldehyde resin; the alkylene radicals of the oxyalkylene groups being selected from the class consisting of propylene and mixtures of ethylene and propylene radicals; with the proviso that at least one-half by weight of said oxyalkylated resin consist of a multiple of the divalent oxypropylene group, $C_3H_6O$.

2. A process for inhibiting foam, characterized by subjecting a non-detersive foaming composition to the action of not more than 1% of a hydrophile synthetic product; said hydrophile synthetic product being an oxyalkylation product of (A) an alpha-beta alkylene oxide selected from the class consisting of propylene oxide and mixtures of ethylene and propylene oxides, and (B) an oxyalkylation-susceptible, fusible, organic-solvent-soluble, water-insoluble phenolaldehyde resin; said resin being derived by reaction between a difunctional monohydric phenol and an aldehyde having not over 8 carbon atoms and reactive toward said phenol, said resin being formed in the substantial absence of phenols of functionality greater than two; said phenol being of the formula

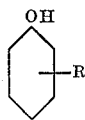

in which R is a hydrocarbon radical having at least 4 and not more than 14 carbon atoms and substituted in the 2,4,6 position; said oxylalkylated resin being characterized by the introduction into the resin molecule of a plurality of divalent radicals having the formula $(R_1O)_n$, in which $R_1$ is a member selected from the class consisting of propylene radicals and mixtures of ethylene and propylene radicals; $n$ being a numeral of such size that at least one-half by weight of said oxyalkylated resin consists of a multiple of the divalent oxypropylene group, $C_3H_6O$.

3. A process for inhibiting foam, characterized by subjecting a non-detersive foaming composition to the action of not more than 1% of a hydrophile synthetic product; said hydrophile synthetic product being an oxyalkylation product of (A) an alpha-beta alkylene oxide selected from the class consisting of propylene oxide and mixtures of ethylene and propylene oxides, and (B) an oxyalkylation-susceptible, fusible, organic-solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of phenols of functionality greater than two; said phenol being of the formula

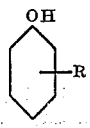

in which R is a hydrocarbon radial having at least 4 and not more than 14 carbon atoms and substituted in the 2,4,6 position; said oxyalkylated resin being characterized by the introduction into the resin molecule of a plurality of divalent radicals having the formula $(R_1O)_n$ in which $R_1$ is a member selected from the class consisting of propylene radicals and mixtures of ethylene and propylene radicals; $n$ being a numeral of such size that at least one-half by weight of said oxyalkylated resin consists of a multiple of the divalent oxypropylene group, $C_3H_6O$; with the final proviso that the hydrophile properties of said oxyalkylated resin in an equal weight of xylene are sufficient to produce an emulsion when said xylene solution is shaken vigorously with one to three volumes of water.

4. A process for inhibiting foam, characterized by subjecting a non-detersive foaming composition to the action of not more than 1% of a hydrophile synthetic product; said hydrophile synthetic product being an oxyalkylation product of (A) ethylene oxide; (B) propylene oxide; and (C) an oxyalkylation-susceptible, fusible, organic-solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of phenols of functionality greater than two; said phenol being of the formula

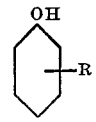

in which R is a hydrocarbon radical having at least 4 and not more 14 carbon atoms and substituted in the 2,4,6 position; said oxyalkylated resin being characterized by introduction into the resin molecule of a plurality of divalent groups having the formulas $(C_2H_4O)_n$ and $(C_3H_6O)_{n'}$, where $n$ and $n'$ are numerals of such size that at least one-half by weight of said oxyalkylated resin consists of a multiple of the divalent oxypropylene group, $C_3H_6O$; with the final proviso that the hydrophile properties of said oxyalkylated resin in an equal weight of xylene are sufficient to produce an emulsion when said xylene solution is shaken vigorously with one to three volumes of water.

5. A process for inhibiting foam, characterized by subjecting a non-detersive foaming composition to the action of not more than 1% of a hydrophile synthetic product; said hydrophile synthetic product being an oxyalkylation product of (A) ethylene oxide; (B) propylene oxide; and (C) an oxyalkylation-susceptible, fusible, organic-solvent-soluble, water-insoluble, low-stage phenol-aldehyde resin having an average molecular weight corresponding to at least 3 and not over 7 phenolic nuclei per resin molecule; said resin being derived by reaction between a di-functional monohydric phenol and an aldehyde having not over 8 carbon atoms and reactive toward said phenol; said resin being formed in the substantial absence of phenols of functionality greater than two; said phenol being of the formula

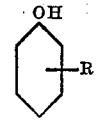

in which R is a hydrocarbon radical having at least 4 and more than 14 carbon atoms and substituted in the 2,4,6 positions; said oxyalkylated resin being characterized by the introduction into the resin molecule of a plurality of divalent groups having the formulas $(C_2H_4O)_n$ and $(C_3H_6O)_{n'}$, wherein $n$ and $n'$ are numerals of such size that at least one-half by weight of said oxyalkylated resin consists of a multiple of the divalent oxypropylene group, C₃H₆O; with the final proviso that the hydrophile properties of said oxyalkylated resin in an equal weight of xylene are sufficient to produce an emulsion when said xylene solution is shaken vigorously with one to three volumes of water.

6. A process for inhibiting foam, characterized by subjecting a non-detersive foaming composition to the action of not more than 1% of a hydrophile synthetic product; said hydrophile synthetic product being an oxyalkylation product of (A) ethylene oxide; (B) propylene oxide; and (C) an oxyalkylation-susceptible, fusible, organic-solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and an aldehyde having not over 8 carbon atoms and reactive toward said phenol; said resin being formed in the substantial absence of phenols of functionality greater than two; said phenol being of the formula

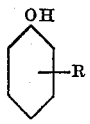

in which R is an aliphatic hydrocarbon radical having at least 4 and not more than 14 carbon atoms and substituted in the 2,4,6 position; said oxyalkylated resin being characterized by introduction into the resin molecule of a plurality of divalent groups having the formulas $(C_2H_4O)_n$ and $(C_3H_6O)_{n'}$, wherein $n$ and $n'$ are numerals of such size that at least one-half by weight of said oxyalkylated resin consists of a multiple of the divalent oxypropylene group, C₃H₆O; with the final proviso that the hydrophile properties of said oxyalkylated resin in an equal weight of xylene are sufficient to produce an emulsion when said xylene solution is shaken vigorously with one to three volumes of water.

7. A process for inhibiting foam, characterized by subjecting a non-detersive foaming composition to the action of not more than 1% of a hydrophile synthetic product; said hydrophile synthetic product being an oxyalkylation product of (A) ethylene oxide; (B) propylene oxide; and (C) an oxyalkylation-susceptible, fusible, organic-solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and an aliphatic aldehyde having not over 8 carbon atoms and reactive toward said phenol; said resin being formed in the substantial absence of phenols of functionality greater than two; said phenol being of the formula

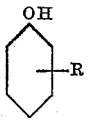

in which R is an aliphatic hydrocarbon radical having at least 4 and not more than 14 carbon atoms and substituted in the 2,4,6 position; said oxyalkylated resin being characterized by introduction into the resin molecule of a plurality of divalent groups having the formulas $(C_2H_4O)_n$ and $(C_3H_6O)_{n'}$, wherein $n$ and $n'$ are numerals of such size that at least one-half by weight of said oxyalkylated resin consists of a multiple of the divalent oxypropylene group, C₃H₆O; with the final proviso that the hydrophile properties of said oxyalkylated resin in an equal weight of xylene are sufficient to produce an emulsion when said xylene solution is shaken vigorously with one to three volumes of water.

8. A process for inhibiting foam, characterized by subjecting a non-detersive foaming composition to the action of not more than 1% of a hydrophile synthetic product; said hydrophile synthetic product being an oxyalkylation product of (A) ethylene oxide; (B) propylene oxide; and (C) oxyalkylation-susceptible, fusible, organic-solvent-soluble, water-insoluble, low-stage phenol-formaldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than two; said phenol being of the formula

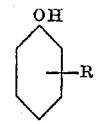

in which R is an aliphatic hyrocarbon radical having at least 4 and not more than 14 carbon atoms and substituted in the 2,4,6 position; said oxyalkylated resin being characterized by the introduction into the resin molecule of a plurality of divalent groups having the formulas $(C_2H_4O)_n$ and $(C_3H_6O)_{n'}$, wherein $n$ and $n'$ are numerals of such size that at least one-half of said oxyalkylated resin consists of a multiple of the divalent oxypropylene group, C₃H₆O; with the final proviso that the hydrophile properties of said oxyalkylated resin in an equal weight of xylene are sufficient to produce an emulsion when said xylene solution is shaken vigorously with one to three volumes of water.

9. A process for inhibiting foam, characterized by subjecting a non-detersive foaming composition to the action of not more than 1% of a hydrophile synthetic product; said hydrophile synthetic product being an oxyalkylation product of (A) ethylene oxide; (B) propylene oxide; and (C) an oxyalkylation-susceptible, fusible, organic-solvent-soluble, water-insoluble, low-stage, acid-catalyzed phenol-formaldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than two, said phenol being of the formula

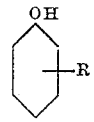

in which R is an aliphatic hydrocarbon radical having at least 4 and not more than 14 carbon atoms and substituted in the 2,4,6 position; said oxyalkylated resin being characterized by the introduction into the resin molecule of a plurality of divalent groups having the formulas $(C_2H_4O)_n$ and $(C_3H_6O)_{n'}$, wherein $n$ and $n'$ are numerals of such size that least one-half by weight of said oxyalkylated resin consists of a multiple of the divalent oxypropylene group, C₃H₆O; with the final proviso that the hydrophile properties of said oxyalkylated resin in an equal weight of xylene are sufficient to produce an emulsion when said xylene solution is shaken vigorously with one to three volumes of water.

10. The process of claim 9, wherein R is a butyl radical.

11. The process of claim 9, wherein R is an amyl radical.

12. The process of claim 9, wherein R is an octyl radical.

13. The process of claim 9, wherein R is a nonyl radical.

14. The process of claim 9, wherein R is a tetradecyl radical.

References Cited in the file of this patent

UNITED STATES PATENTS

| | | |
|---|---|---|
| 2,454,541 | Bock et al. | Nov. 23, 1948 |
| 2,454,544 | Bock et al. | Nov. 23, 1948 |
| 2,557,081 | De Groote et al. | June 19, 1951 |